United States Patent
Kolodziej

(10) Patent No.: US 9,797,730 B2
(45) Date of Patent: Oct. 24, 2017

(54) DETECTED ARRIVAL AT NAVIGATED DESTINATION AUTOMATICALLY TRIGGERS DELIVERY OF RELEVANT LOCAL INFORMATION TO USER

(75) Inventor: Kris Kolodziej, Asbury, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 748 days.

(21) Appl. No.: 12/870,412

(22) Filed: Aug. 27, 2010

(65) Prior Publication Data

US 2012/0054032 A1  Mar. 1, 2012

(51) Int. Cl.
G06Q 30/00 (2012.01)
G01C 21/20 (2006.01)
G06Q 30/02 (2012.01)

(52) U.S. Cl.
CPC ......... *G01C 21/20* (2013.01); *G06Q 30/0261* (2013.01)

(58) Field of Classification Search
USPC .......................................................... 705/14
See application file for complete search history.

(56) References Cited

U.S. PATENT DOCUMENTS

| | | | |
|---|---|---|---|
| 5,910,782 A | 6/1999 | Schmitt et al. | |
| 5,991,689 A | 11/1999 | Aito et al. | |
| 6,147,624 A | 11/2000 | Clapper | |
| 6,266,609 B1 * | 7/2001 | Fastenrath | G06Q 30/0284 235/384 |
| 6,360,101 B1 * | 3/2002 | Irvin | H04W 4/021 455/456.6 |
| 6,650,999 B1 | 11/2003 | Brust et al. | |
| RE38,626 E * | 10/2004 | Kielland | G07B 15/02 194/902 |
| 6,934,624 B2 * | 8/2005 | Deh-Lee | G01C 21/26 340/994 |

(Continued)

FOREIGN PATENT DOCUMENTS

| | | |
|---|---|---|
| EP | 2080984 | 7/2009 |
| EP | 2104018 | 9/2009 |

(Continued)

OTHER PUBLICATIONS

Popular Mobile Couponing App. Yowzall Co-Created by Heroes' Star, Greg Grunberg, Launches, Yowzall Version 2.0 with Advanced Features and More Retail Partners; https://getyowza.com/pr/releases/2009/09/1; 2009-2010.

(Continued)

*Primary Examiner* — Matthew T Sittner

(57) ABSTRACT

A mobile navigation system may include a navigation computer, an arrival detection system, and an information delivery system. The navigation computer may be configured to receive a destination to which a user of the mobile navigation system wishes to travel and to provide guidance to the user about how to navigate to the destination. The arrival detection system may be configured to automatically detect when the mobile navigation system has arrived at the destination. The information delivery system may be configured to provide local information to the user that is tailored to the specific destination in response to detection by the arrival detection system of the arrival of the mobile navigation system at the destination. The local information may not be merely an announcement that the user has arrived at the destination.

22 Claims, 6 Drawing Sheets

(56) References Cited

U.S. PATENT DOCUMENTS

| | | | |
|---|---|---|---|
| 6,970,101 B1 | 11/2005 | Squire et al. | |
| 7,200,387 B1 | 4/2007 | Ephraim et al. | |
| 7,834,778 B2* | 11/2010 | Browne et al. | 340/932.2 |
| 2001/0041960 A1 | 11/2001 | Hashida | |
| 2002/0049533 A1 | 4/2002 | Kusano et al. | |
| 2002/0077910 A1 | 6/2002 | Shioda et al. | |
| 2002/0098855 A1* | 7/2002 | Hartmaier | H04M 3/42127 455/466 |
| 2002/0171562 A1* | 11/2002 | Muraki | G08G 1/14 340/932.2 |
| 2003/0046304 A1* | 3/2003 | Peskin | G06Q 10/109 |
| 2003/0074129 A1* | 4/2003 | Curbow | G01C 21/26 701/523 |
| 2003/0208595 A1* | 11/2003 | Gouge | H04L 67/16 709/225 |
| 2003/0220835 A1* | 11/2003 | Barnes, Jr. | G06Q 10/1053 705/14.36 |
| 2004/0068433 A1* | 4/2004 | Chatterjee | G06Q 20/127 705/13 |
| 2005/0039136 A1 | 2/2005 | Othmer | |
| 2005/0055308 A1 | 3/2005 | Meyer et al. | |
| 2005/0114014 A1* | 5/2005 | Isaac | G01C 21/26 701/465 |
| 2005/0143095 A1 | 6/2005 | Jacob | |
| 2005/0258980 A1* | 11/2005 | Conover | G08G 1/133 340/994 |
| 2006/0111835 A1* | 5/2006 | Baker | G01C 21/26 701/408 |
| 2006/0149684 A1* | 7/2006 | Matsuura | G06Q 20/367 705/65 |
| 2006/0178943 A1* | 8/2006 | Rollinson | G06Q 30/0601 705/26.1 |
| 2006/0247854 A1* | 11/2006 | Esaki | G01C 21/28 701/505 |
| 2006/0253226 A1* | 11/2006 | Mendelson | G08G 1/14 701/1 |
| 2006/0267799 A1* | 11/2006 | Mendelson | G08G 1/14 340/932.2 |
| 2007/0047782 A1* | 3/2007 | Hull | G06K 9/00442 382/124 |
| 2008/0004791 A1 | 1/2008 | Sera | |
| 2008/0051951 A1* | 2/2008 | Camacho | E04H 6/422 701/23 |
| 2008/0167806 A1 | 7/2008 | Wheeler et al. | |
| 2008/0222004 A1 | 9/2008 | Pollock et al. | |
| 2009/0085773 A1* | 4/2009 | Sin | G08G 1/14 340/932.2 |
| 2009/0088959 A1* | 4/2009 | Mori | G08G 1/0104 701/118 |
| 2009/0146846 A1* | 6/2009 | Grossman | B60R 25/04 340/988 |
| 2009/0153362 A1* | 6/2009 | Goto | G01C 21/32 340/932.2 |
| 2009/0172118 A1* | 7/2009 | Lee | H04L 12/5855 709/206 |
| 2009/0187340 A1 | 7/2009 | Vavrus et al. | |
| 2009/0197617 A1 | 8/2009 | Jayanthi | |
| 2009/0198443 A1* | 8/2009 | Yamazaki | G01C 21/3605 701/414 |
| 2009/0198623 A1* | 8/2009 | Rubinstein | G06Q 10/06398 705/80 |
| 2009/0234741 A1 | 9/2009 | Saitoh et al. | |
| 2009/0240575 A1 | 9/2009 | Bettez et al. | |
| 2009/0276589 A1* | 11/2009 | Mylaraswamy | H04W 4/02 711/162 |
| 2009/0306881 A1* | 12/2009 | Dolgov | G05D 1/0246 701/28 |
| 2009/0309759 A1 | 12/2009 | Williams | |
| 2009/0309761 A1* | 12/2009 | Nagase | G01C 21/3617 340/932.2 |
| 2009/0313109 A1 | 12/2009 | Bous et al. | |
| 2010/0004959 A1 | 1/2010 | Weingrad | |
| 2010/0052946 A1 | 3/2010 | Levine et al. | |
| 2010/0093333 A1 | 4/2010 | Friedenthal et al. | |
| 2010/0106356 A1* | 4/2010 | Trepagnier | G01S 17/023 701/25 |
| 2010/0121567 A1* | 5/2010 | Mendelson | G01C 21/206 701/467 |
| 2010/0125497 A1 | 5/2010 | Arguello | |
| 2010/0153010 A1* | 6/2010 | Huang | G01C 21/3461 701/414 |
| 2010/0156933 A1* | 6/2010 | Jones | G06Q 30/02 345/629 |
| 2010/0190510 A1* | 7/2010 | Maranhas | G06Q 10/02 455/456.1 |
| 2010/0201536 A1 | 8/2010 | Robertson et al. | |
| 2010/0204914 A1* | 8/2010 | Gad | G01C 21/36 701/533 |
| 2010/0268592 A1 | 10/2010 | Shaer | |
| 2010/0302068 A1* | 12/2010 | Bandukwala | H04W 4/046 340/932.2 |
| 2011/0004496 A1* | 1/2011 | Erb | G06Q 10/02 705/5 |
| 2011/0029232 A1* | 2/2011 | Hattori | G01C 21/3682 701/533 |
| 2011/0047471 A1 | 2/2011 | Lord et al. | |
| 2011/0213551 A1* | 9/2011 | Shioda | G01C 21/3423 701/533 |
| 2011/0224864 A1* | 9/2011 | Gellatly | G01C 21/3679 701/29.5 |
| 2011/0224899 A1 | 9/2011 | Mathews | |
| 2011/0238301 A1 | 9/2011 | Lee | |
| 2011/0244887 A1* | 10/2011 | Dupray | G01C 21/206 455/456.2 |
| 2012/0002989 A1 | 1/2012 | Sakata et al. | |
| 2012/0003989 A1* | 1/2012 | Gravino | 455/456.1 |
| 2012/0053833 A1* | 3/2012 | Kolodziej | G06Q 30/02 701/465 |
| 2012/0053966 A1* | 3/2012 | Kolodziej | G06Q 10/02 705/5 |
| 2012/0054032 A1* | 3/2012 | Kolodziej | G06Q 30/0261 705/14.58 |
| 2012/0089470 A1* | 4/2012 | Barnes, Jr. | G06Q 10/1053 705/16 |
| 2012/0203600 A1 | 8/2012 | Fiorucci et al. | |
| 2012/0265434 A1 | 10/2012 | Woodard et al. | |
| 2013/0030694 A1* | 1/2013 | Nortrup | G01C 21/3667 701/410 |
| 2015/0018011 A1* | 1/2015 | Mendelson | G01C 21/206 455/456.3 |

FOREIGN PATENT DOCUMENTS

| | | |
|---|---|---|
| JP | 7-229752 | 8/1995 |
| JP | 10-170301 | 6/1998 |
| JP | 2001-074491 | 3/2001 |
| JP | 2008-122340 | 5/2008 |

OTHER PUBLICATIONS

U.S. Appl. No. 12/870,389, filed Aug. 27, 2010.
U.S. Appl. No. 12/870,460, filed Aug. 27, 2010.
Google Mobile Blog: Check in with Google Latitude. Weblog dated Feb. 1, 2011. (Downloaded from http://googlemobile.blogspot.com/2011/02/check-in-with-google-latitude.html).
Droid Life: A Droid Community Blog—All about Android and the DROID lineup of phones, Rooting, Apps, Review, and Videos. Google Maps 5.1.0 Update Available, Allows for Auto Check-in and Friend Notification (Updated). Dated Feb. 1, 2011, in Apps, News, by Kellex. (Downloaded from http://www.droid-life.com/2011/02/01/google-maps-5-1-0-update-available.).
Google Mobile: Mobile: Check-ins, Check-ins Overview. 2011. (Downloaded from http://www.google.com/support/mobile/bin/answerpy?answer-1138301.).

\* cited by examiner

DETECTED ARRIVAL AT NAVIGATED DESTINATION AUTOMATICALLY TRIGGERS DELIVERY OF RELEVANT LOCAL INFORMATION TO USER

BACKGROUND

Technical Field

This disclosure relates to mobile navigation systems, including mobile navigations systems incorporated into cell phones.

Description of Related Art

Mobile navigation systems provide guidance about how to navigate to a destination. Upon arrival, however, a user may need to perform one or more tasks that can be time consuming and/or that can cause confusion.

SUMMARY

A mobile navigation system may include a navigation computer, an arrival detection system, and an information delivery system. The navigation computer may be configured to receive a destination to which a user of the mobile navigation system wishes to travel and to provide guidance to the user about how to navigate to the destination. The arrival detection system may be configured to automatically detect when the mobile navigation system has arrived at the destination. The information delivery system may be configured to provide local information to the user that is tailored to the specific destination in response to detection by the arrival detection system of the arrival of the mobile navigation system at the destination. The local information may not be merely an announcement that the user has arrived at the destination.

The mobile navigation system may be part of a cellular telephone.

The local information may include a local map of the destination. The destination may be an airport and the local map may be a map of the airport. The destination may be a shopping center and the local map may be a map of the shopping center.

The navigation computer may be configured to allow the user to select a location on the local map and to provide guidance to the user about how to navigate to the location.

The local information may include promotional information relating to one or more establishments at or near the destination. The promotional information may include one or more advertisements. The advertisements may include one or more coupons.

The promotional information may be about a competitor of an establishment that is near the destination.

The navigation computer may be configured to allow the user to select one of the establishments and to provide guidance to the user about how to navigate to the selected establishment.

The local information may include parking space location information about the location of a vacant parking space. The parking space location information may be based on a database of notices from vehicles leaving parking spaces.

The local information may include a search function which the user may use to locate a more specific location at the destination.

The local information may be based on a profile of the user. The profile of the user may include data relating to other destinations to which the navigation computer has guided the user.

The information delivery system may be configured to ask the user for permission to provide the local information to the user.

The information delivery system may be configured to automatically provide the local information to the user upon detection by the arrival detection system of the arrival of the mobile navigation system at the destination.

At the time the navigation computer receives the destination to which the user wishes to travel, the information delivery system may be configured to ask the user whether the user wants the local information to be provided in response to detection by the arrival detection system of the arrival of the mobile navigation system at destinations.

The information delivery system may include a global user setting which a user may set to automatically receive or not to automatically receive the local information each time the arrival detection system detects the arrival of the mobile navigation system at a destination.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Some embodiments may be practiced with additional components or steps and/or without all of the components or steps which are disclosed.

Figure 1:
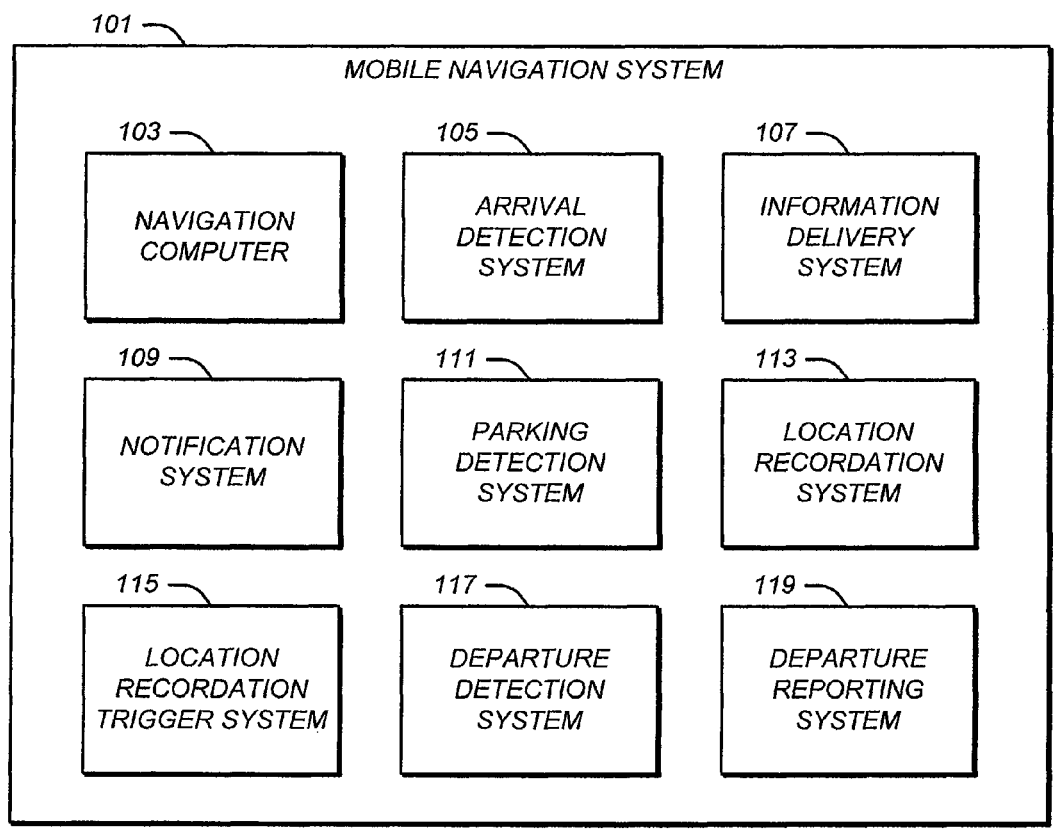
FIG. 1 illustrates a mobile navigation system.

FIG. 1 illustrates a mobile navigation system 101. As illustrated in FIG. 1, the mobile navigation system 101 may include a navigation computer 103, an arrival detection system 105, and information delivery system 107, a notification system 109, a parking detection system 111, a location recordation system 113, a location recordation trigger system 115, a departure detection system 117, and a departure reporting system 119. The mobile navigation system 101 may include additional components and/or may not have all of these components.

The mobile navigation system 101 may be part of a wireless mobile communication device, such as a cell phone, tablet computer, or portable navigation device (PND).

Each of the components of the mobile navigation system 101 may include computer hardware and software configured to perform the functions of the component which are described herein. The hardware may include one or more computer processors, volatile and non-volatile memories, user interface components, network interface components, and/or any other type of hardware device. The software may include one or more operating systems, application programs, and/or any other type of computer software. The software may be stored in a memory and/or any other type of data storage device. All or portions of the software may be stored on The same hardware and/or software may be shared among one or more of the components of the mobile navigation system 101.

The navigation computer 103 may be configured to receive a destination to which a user of the mobile navigation system 101 wishes to travel and to provide guidance to the user about how to navigate to that destination. The navigation computer 103 may include a location identification system configured to identify the location of the mobile navigation system 101. The location identification system may include a GPS receiver, may rely upon triangulation technology, and/or may rely upon any other type of location identification technology. The navigation computer 103 may include one or more street maps, thereby enabling the navigation computer 103 to determine an available travel route and to provide turn instructions to the user based on the current location of the user. The turn instructions may be provided through any means, such audibly and/or on a display. In some configurations, the maps, routing computations, and routing instructions may, respectively, be contained, formulated, and expressed, by a computer system which is remote from the mobile navigation system 101.

The arrival detection system 105 may be configured to automatically detect when the mobile navigation system 101 has arrived at the destination. This may be accomplished, for example, by comparing the destination programmed into the navigation computer 103 by the user with the current location of the mobile navigation system 101. When the two are within a predetermined range, the arrival detection system 105 may be configured to conclude that the mobile navigation system 101 has arrived at the destination.

The information delivery system 107 may be configured to provide local information to the user in response to detection by the arrival detection system 105 of the arrival of the mobile navigation system 101 at the destination. The local information may be tailored to the specific destination and may be information other than merely an announcement that the user has arrived at the destination.

Figure 2:
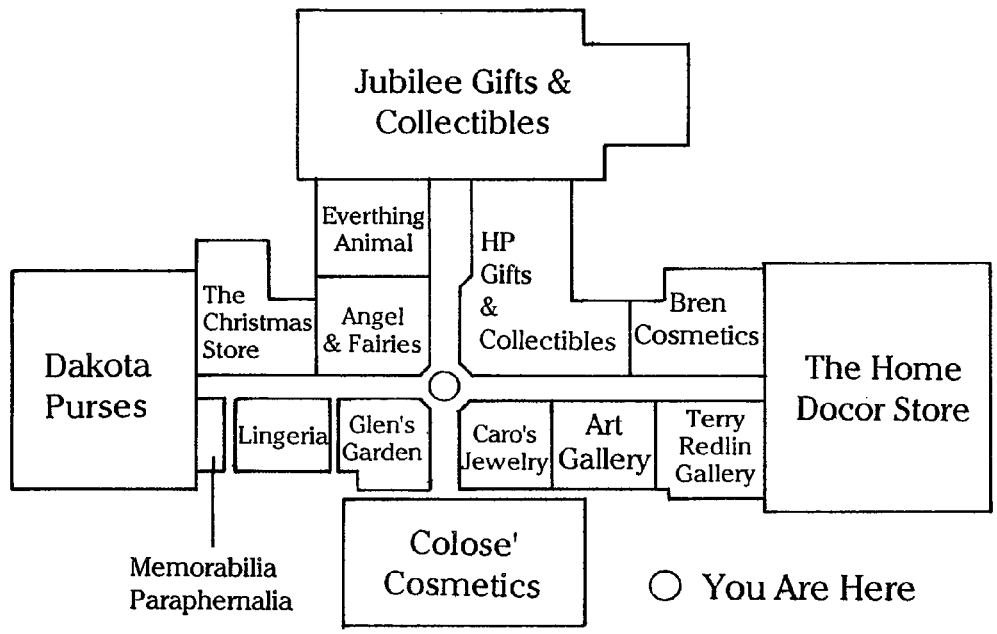
FIG. 2 is an example of a map of a shopping center that may be provided by a mobile navigation system upon arrival at the shopping center.
Figure 3:
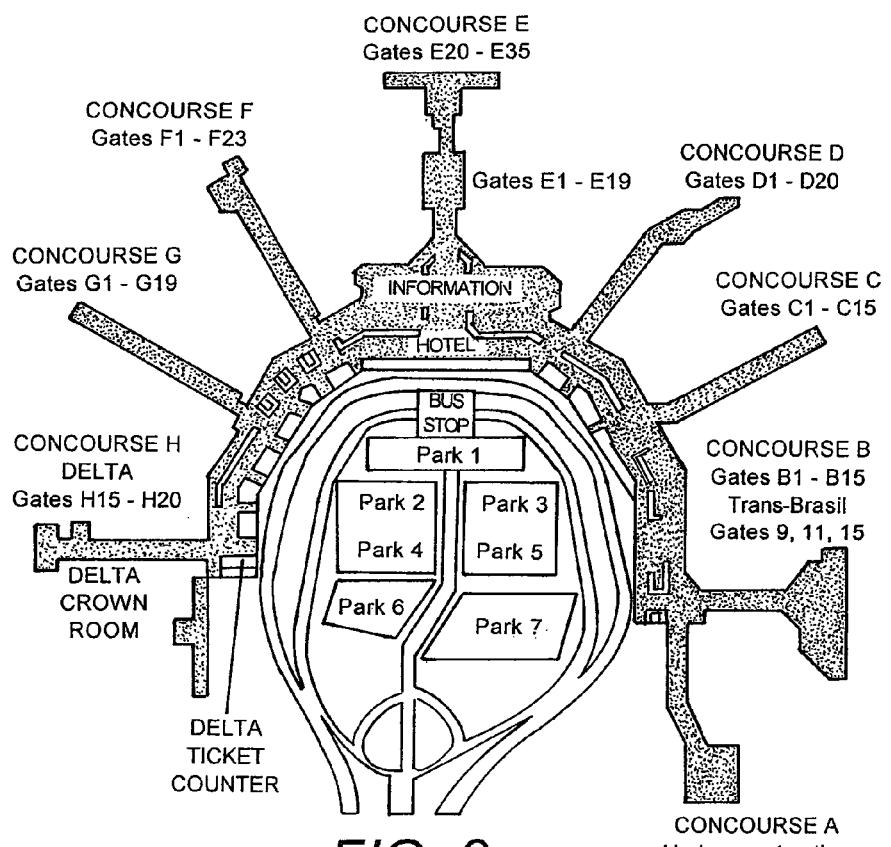
FIG. 3 is an example of a map of an airport that may be provided by a mobile navigation system upon arrival at the airport.

For example, the local information may include a local map of the destination. When the destination is a shopping mall, for example, a map of the various stores in the shopping mall may be provided, as illustrated in FIG. 2. When the destination is an airport, a map of the airport terminal may instead be provided, as illustrated in FIG. 3.

Following presentation of a local map, the navigation computer 103 may be configured to allow a user to select a particular location on the local map to which the user wishes to travel. The navigation computer 103 may then provide guidance to the user about how to navigate to this location.

Another example of local information which the information delivery system 107 may be configured to provide is promotional information relating to one or more establishments at or near the destination. The promotional information, for example, may include one or more advertisements, such as one or more coupons. The promotional information may include information about a competitor about the establishment that is not at the destination, but that is near the destination. In the event that the information delivery system 107 provides the user with promotional information about several establishments at or near the destination, the navigation computer 103 may be configured to allow the user to select one of these establishments and to thereafter provide guidance to the user about how to navigate to it.

Figure 4:
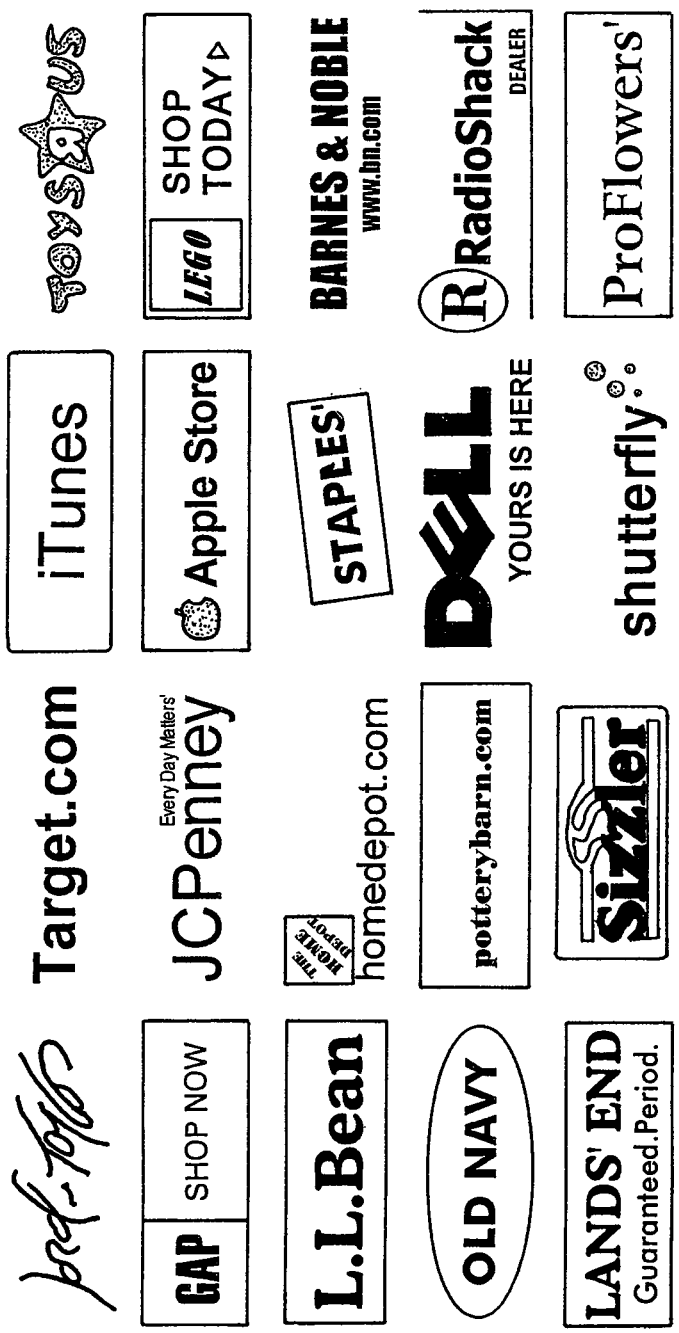
FIG. 4 is an example of links to promotional items from local establishments that may be provided by a mobile navigation system upon arrival at one of the establishments.

FIG. 4 is an example of links to promotional items from local establishments that may be provided by a mobile navigation system upon arrival at one of the establishments. FIG. 4 illustrates the logos of various establishments at the destination. The information delivery system 107 may be configured to allow a user to select the logo of one of these establishments, following which the information delivery system 107 may be configured to provide more specific promotional information about the establishment, such as information about sales at the establishment, coupons that may be redeemed at the establishment, and/or other types of promotional information. The navigation computer 103 may be configured to provide the user guidance as to how to navigate to a selected establishment.

As another example, the information delivery system 107 may be configured to provide parking space location information about the location of vacant parking spaces. The parking space location information may be based on a database of notices from vehicles leaving these parking spaces.

The information delivery system 107 may be configured to provide information about available parking spaces in any format. For example, the information delivery system 107 may cause a map to be displayed which illustrates the location of the available parking spaces. The navigation computer 103 may be configured to allow a user to select an available parking space and, thereafter, to provide guidance as to how the user may navigate to that space. In addition or instead, the information delivery system 107 may itself select an available parking space and automatically cause the navigation computer 103 to provide guidance as to how to navigate to this space.

More details about these parking spaces and about a parking space database system that may be used in connection with them are discussed below.

As another example, the information delivery system 107 may provide a search function which the user may use to locate a more specific location at the destination. For example, the information delivery system 107 may allow the user to enter one or more key words, following which the information delivery system 107 may search for and present local information that matches. The information delivery system 107 may in addition or instead present a menu of generic classes of products or services from which the user may chose. Again, the navigation computer 103 may be configured to provide guidance to the user about how to navigate to a selected location.

The information delivery system 107 may be configured to tailor the local information which it provides based on a profile of the user. This may enhance the likelihood that the local information will be of interest to the user. The profile of the user may be based on any type of information, such as upon an analysis of the destinations to which the user has previously gone, profile information which the user may have directly supplied, and/or any other source of profile information.

The notification system 109 may be configured to transmit an arrival notice indicating that the user has arrived at the destination in response to detection by the arrival detection system 105 of the arrival of the mobile navigation system 101 at the destination. The notification system 109 may be configured to transmit the arrival notice wirelessly.

The notification system may be configured to ask the user to where it should transmit the arrival notice, to receive information indicative of this requested location from the user, and to transmit the arrival notice to this location.

The arrival notice may be sent to any person or location. For example, the arrival notice may be sent to a representative of an airline. The representative may be an employee, a third party agent, an automated computerized system, such as an automated check-in system, or any other type of human or automated representative. The arrival notice may be configured to cause the user to be checked into a flight of the airline. This may be accomplished in cooperation with a corresponding computer system at the airline that may be configured to receive such arrival notices and to automatically check the sender in as a consequence.

In another example, the arrival notice may be delivered to a representative of a hotel. Again, the representative may be an employee, a third party agent, an automated computerized system, such as an automated check-in system, or any other type of human or automated representative. Similarly, the arrival notice may be configured to cause the user to be checked into the hotel. Similarly, the hotel may have a corresponding computer system configured to receive such arrival notices and to check in the senders in as a consequence.

In another example, the arrival notice may be delivered to a fast food restaurant. The user might pre-order the food, and the arrival notice may cause payment to be issued for the food and/or for the food to be delivered to a vehicle in which the user is traveling.

In another example, the arrival notice may result in the user receiving a reward, such a points and/or airline miles, from a loyalty program.

In a still further example, the arrival notice may be sent to a parking garage. Upon arrival, the parking garage system may update its data to indicate that the parking spot is taken and to start measuring the parking time for billing purposes.

As a still further example, the notification system 109 may be configured to wirelessly transmit the arrival notice to a representative of a food service.

The arrival notice may be configured to trigger payment for merchandise or a service. The payment may be made, for example, by a credit card or account which the user has supplied, either as part of the arrival notice, or as part of an earlier registration process.

As a still further example, the arrival notice may be configured to trigger the delivery of merchandise or a service to a vehicle in which the user is traveling. For example, the user may phone in an order before arriving and the arrival notice may cause payment to be issued for the order and notice to the merchant to deliver the paid-for merchandise or service to the vehicle in which the user is traveling. The arrival notice may include information about vehicle, including its location, which may be obtained from the navigation computer 103.

In a still further example, the arrival notice may be configured to trigger the delivery of one or more promotional items to the user relating to one or more establishments at or near the destination. The promotional items may delivered by a merchant or other entity to whom the arrival notice was sent.

The notification system 109 may be configured to wirelessly transmit the arrival notice to a representative of a conference that has been scheduled to take place at the destination.

The notification system 109 may be configured to wirelessly transmit an arrival notice to multiple recipients. For example, the multiple recipients may include attendees at a conference that has been scheduled to take place at the destination.

The notification system 109 may be configured to wirelessly transmit the arrival notice to a social networking site in a fashion that causes notice of the arrival of the user to be published by the social networking sight. For example, the notification system 109 may be configured to wirelessly transmit the arrival notice to Twitter as a tweet, LinkedIn, and/or Facebook.

The parking detection system 111 may be configured to detect when a vehicle carrying the mobile navigation system has parked in a parking space. The parking detection system 111 may be configured to detect when a vehicle has parked in a parking space using any means. For example, the parking detection system 111 may be configured to detect that the vehicle has parked in the parking space by sensing when the vehicle has been substantially motionless for a predetermined period of time. This may be based on a series of location reports from the navigation computer 103 which show no movement of the vehicle and/or based on a separate motion detector which may be part of the parking detection system 111. The predetermined period of time may be any amount. For example, it may be long enough to avoid false triggers by temporary stops of the vehicle, but not as long as it typically takes for an operator of the vehicle to walk away from the vehicle after it is parked.

In an alternate configuration, the parking detection system 111 may have a map of the parking spaces and, based on location information from the navigation computer 103, may determine that a vehicle has parked in one of these mapped spaces when the location report from the navigation computer 103 indicates that the vehicle is at one of these spaces. Even in this configuration, the parking detection system 111 may wait until the vehicle has been substantially motionless for a predetermined period of time.

The location recordation system 113 may be configured to record the current location of the vehicle upon command. It may be configured to do so in a format that the navigation computer 103 can interpret as a destination. In turn, the navigation computer 103 may be configured to allow a user to request that the navigation computer 103 provide guidance to the user about how to navigate back to the parking space, in the event that the user wishes to receive this assistance when returning to his parked vehicle.

The location recordation trigger system 115 may be configured to command the location recordation system 113 to record the current location of the vehicle under certain circumstances. For example, the location recordation trigger system 115 may be configured to issue this command after the arrival detection system 105 detects the arrival of the vehicle at the destination, and after the parking detection system 111 detects that the vehicle has parked in a parking space. By also requiring detection by the arrival detection system 105 of the arrival of the vehicle at the destination, long stops of the vehicle prior to arrival—such as may be caused by a long red light—may not be falsely interpreted by the parking detection system 111 as an indication that the vehicle has parked. This may be particularly important when the parking detection system 111 detects that a vehicle has parked based on the vehicle being motionless for at least a predetermined period of time.

The departure detection system 117 may be configured to detect when the vehicle has departed from the parking space. The departure detection system 117 may be configured to do so by detecting when the vehicle is again in motion, as detected by the navigation computer 103 and/or by any other independent motion-detecting device. The departure detection system 117 may be configured so that it does not consider any motion of the vehicle to represent a departure from a parking space, but only motion which takes place after the parking detection system 111 has detected that the vehicle has parked. As indicated above, the parking detection system 111 may be prohibited from doing so until after the arrival detection system 105 has detected that the vehicle has arrived at the destination. The departure detection system 117 may in addition or instead be configured to detect when the vehicle has departed from the parking space by detecting a change in its location, as reported by the navigation computer 103.

The departure reporting system 119 may be configured to wirelessly report the departure of the vehicle from the parking space. The departure reporting system 119 may be configured to do so in response to detection by the departure detection system 117 that the vehicle has departed from the parking space.

The departing reporting system 119 may be configured to cause this report to be wirelessly addressed and transmitted to a parking space database system. An example of such a parking space database system is discussed below in connection with FIG. 11.

The report provided by the departure reporting system 119 may include information which identifies the now-vacant parking space, such as information about its location, as previously recorded by the location recordation system 113.

The information delivery system 107, the notification system 109, and/or, the location recordation trigger system 115, may be configured to automatically provide their respective local information, arrival notices, and recordings as described above, without any prompting or intervention by the user, when the arrival detection system 105 detects arrival at the destination. Similarly, the departure reporting system 119 may be configured to automatically provide its departure reports, as described above, without any prompting or intervention by the user, when the departure detection system 117 detects the departure of the vehicle from a parking space.

In some configurations, the information delivery system 107, the notification system 109, the location recordation trigger system 115, and/or the departure reporting system 119 may be configured to ask the user whether each should perform its information providing, reporting, or recordation function before performing the function. The query to the user may or may not take place after the function has been triggered to be performed by the trigger for the function described above. The query to the user may in addition or instead take place at an earlier time, such as when the user programs the navigation computer 103 to navigate the user to a particular destination. The respective system may in addition or instead be configured to allow the user to globally set whether the function of each system should be performed for all destinations by providing global settings which the user may specify when setting up the mobile navigation system 101. After a global setting is set to always provide a function, a query to the user as to whether that function should be performed may still be made at the time the user enters a destination and/or after the trigger for the function takes place.

Examples of such queries and global settings will now be discussed.

Figure 5:
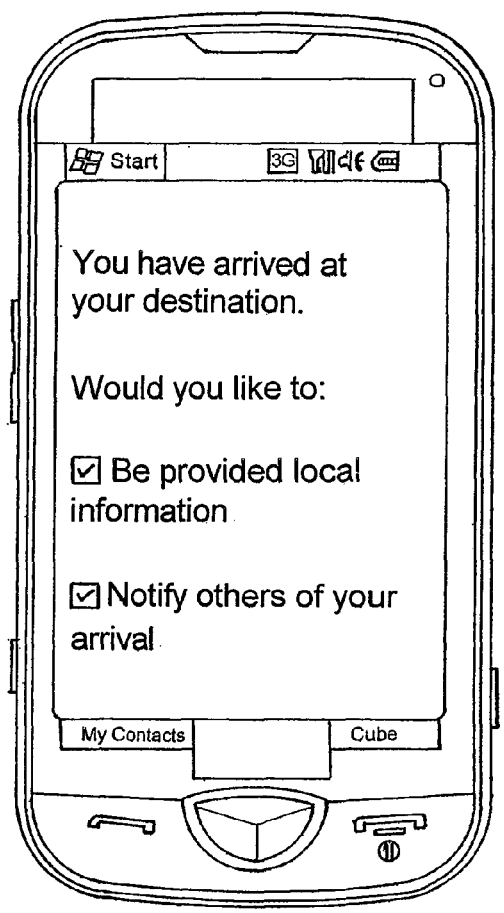
FIG. 5 is an example of questions that a mobile navigation system may ask a user upon arrival at a destination.

FIG. 5 is an example of questions that a mobile navigation system may ask a user upon arrival at a destination. As illustrated in FIG. 5, the user may be asked whether the user wishes to be provided with local information and/or whether notice of the user's arrival should be provided to others. The user may be permitted to select one or both options. A different set of selections may be offered instead.

Figure 6:
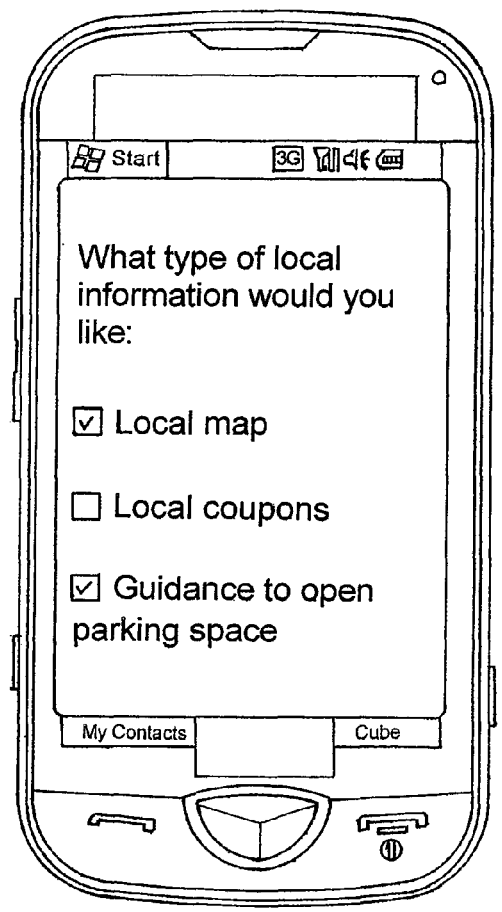
FIG. 6 is an example of questions that a mobile navigation system may ask a user upon arrival at a destination about local information.

FIG. 6 is an example of questions that a mobile navigation system may ask a user upon arrival at a destination about local information. The selectable options illustrated in FIG. 6 may be presented only if the user selected "Be provided local information" in connection with the display illustrated in FIG. 5. As illustrated in FIG. 6, the user may elect to be provided with a local map, local coupons, and/or guidance to an open parking space. The selection of any entry may cause the corresponding local information to be provided, such as is illustrated in FIGS. 2, 3, and/or 4. A different set of selections may be offered instead.

Figure 7:
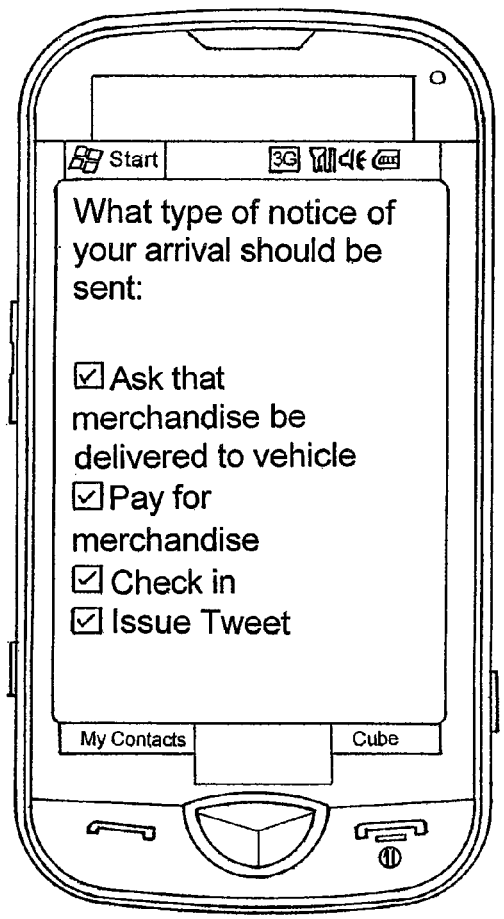
FIG. 7 is an example of questions that a mobile navigation system may ask a user upon arrival at a destination about arrival notices.

FIG. 7 is an example of questions that a mobile navigation system may ask a user upon arrival at a destination about arrival notices. The selectable options illustrated in FIG. 7 may be presented only if the user selected "Notify others of your arrival" in connection with the display illustrated in FIG. 5. As illustrated in FIG. 7, the user may elect to "Ask that merchandise be delivered to vehicle," "Pay for merchandise," "check-in," and/or "issue tweet" as a form of an arrival notice. The selection of any of these options, in turn, may cause other screens to display seeking information relevant to the selection. A different set of selections may be offered instead.

The questions which are asked, as well as their sequence, may be different. Instead of the hierarchical approach illustrated in FIGS. 5-7, for example, a single, long menu of all possible options may instead be displayed.

Figure 8:
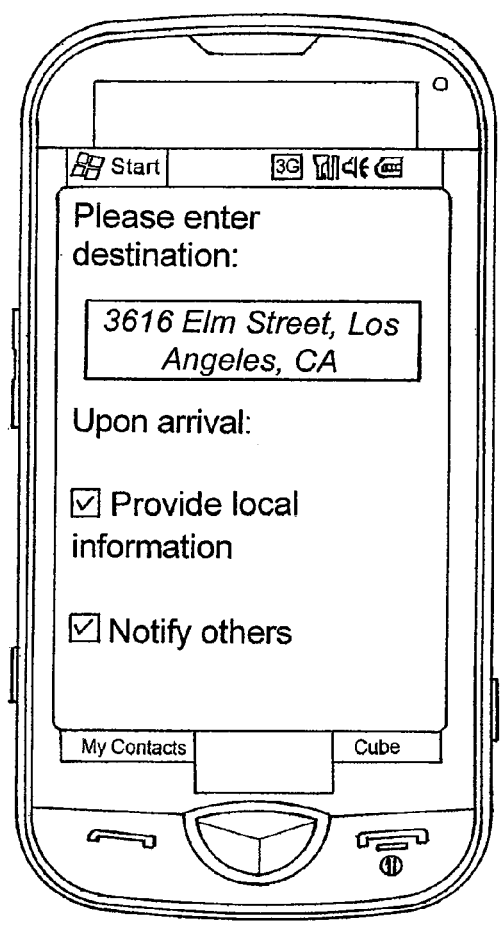
FIG. 8 is an example of arrival options that a user may select when the user is entering a destination in a mobile navigation system.

FIG. 8 is an example of arrival options that a user may select when the user is entering a destination in a mobile navigation system. The options illustrated in FIG. 8 are comparable to those illustrated in FIG. 5 and may be followed, respectively, by screens comparable to those illustrated in FIGS. 6 and 7 upon being selected. One primary difference, however, may be that these selections may be made at the time the user is entering a destination in the mobile navigation system. With respect to the selections which the user has made, confirming questions may or may not be presented when the arrival detection system 105 detects the arrival of the vehicle at the destination. A different set of selections may be offered instead.

Figure 9:
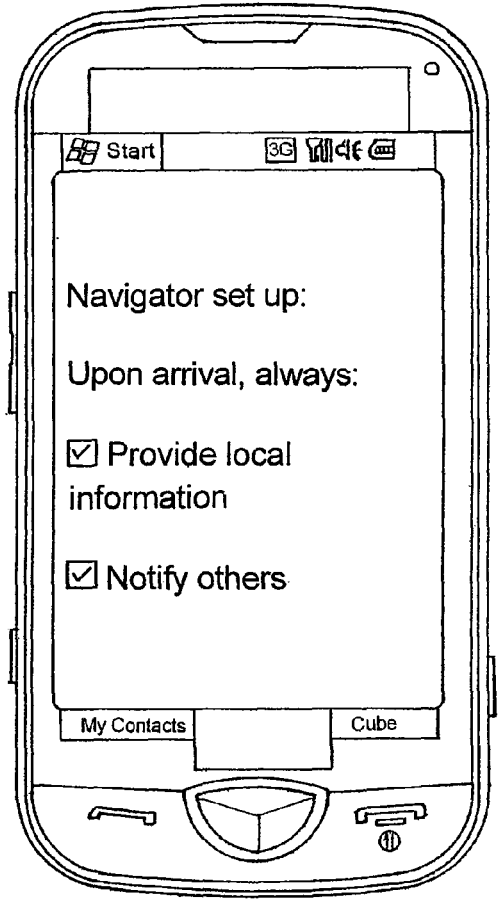
FIG. 9 is an example of global arrival options that a user may select when the user is setting up a mobile navigation system.

FIG. 9 is an example of global arrival options that a user may select when the user is setting up a mobile navigation system. As illustrated in FIG. 9, the user may in addition or instead globally set whether the functions of the information delivery system 107, the notification system 109, the location recordation trigger system 115, and/or the departure reporting system 119 are to be provided at the time the user sets up the mobile navigation system 101. Upon making any selection, subsequent screens, such as those that have been discussed above in connection with FIGS. 6 and 7, may similarly be provided during set up. The user may or may not thereafter again be queried about selected items, such as at the time the user enters a destination, as illustrated in FIG. 8, and/or when the user arrives at the destination, as illustrated in FIGS. 5-7.

Figure 10:
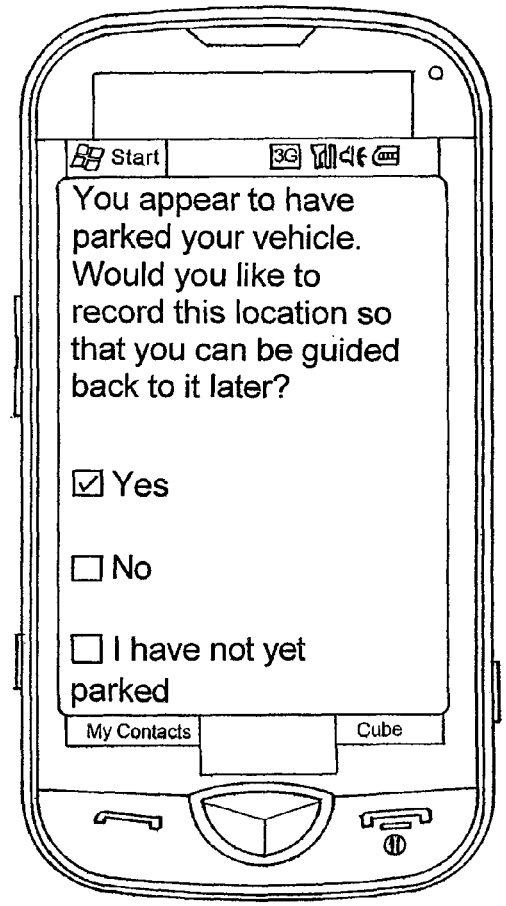
FIG. 10 is an example of a question that a mobile navigation system may ask a user upon detection that the user has parked.

FIG. 10 is an example of a question that a mobile navigation system may ask a user upon detection that the user has parked. As illustrated in FIG. 10, the user may be questioned as to whether the parked location of the vehicle should be recorded after detection that the user has parked by the parking detection system 111. When queried at the time of parking, the user may be given the option to select "I have not yet parked" to compensate for the possibility that the parking detection system 111 has erred in its determination that the vehicle has been parked. When the "I have not yet parked" selection is selected, the parking detection system 111 may be reset and may again detect parking of the vehicle at a later time.

The various choices which may be presented to the user, the times when they may be presented, the format of the presentation, the sequence of the presentation, and/or the choices which are presented may vary. Instead of check boxes, for example, the options may be numbered and selected by the user by entry of the option number.

Figure 11:
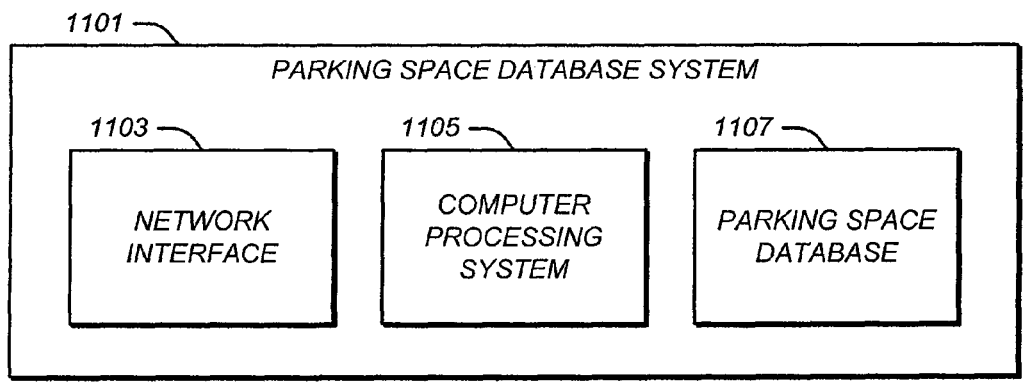
FIG. 11 illustrates a parking space database system.

FIG. 11 illustrates a parking space database system 1101. The parking space database system 1101 may be provided to keep track of the reports from departure reporting systems, such as the departure reporting system 119, of the departure of vehicles from their parking spaces. This information may be received by the parking space database system 1101 through a network interface 1103 and caused to be stored in a parking space database 1107 by a computer processing system 1105. The parking space database 1107 may thus contain information about parking spaces that are available for use.

When a particular mobile navigation system arrives at a destination, its information delivery system, such as the information delivery system 107, may issue a query to the parking space database system 1101 for one or more of the closest available parking spaces. This may be received by the network interface 1103 and delivered to the computer processing system 1105 which may then seek this information from the parking space database 1107 and return it to the information delivery system through the network interface 1103. As suggested above, the network interface 1103 may be configured to communicate this parking information through a computer network, such as through the internet, a WAN, a LAN, and/or a combination of them.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A mobile navigation system comprising:
   a network communication interface;
   a processor coupled to the network communication interface;
   a memory accessible to the processor; and
   programming in the memory, wherein execution of the programming by the processor directs the mobile navigation system to:
   receive, from a user of the mobile navigation system, a destination to which the user of the mobile navigation system wishes to travel and to provide guidance to the user about how to navigate to the destination;
   automatically detect when the mobile navigation system has arrived at the destination by:
   comparing the destination programmed into a navigation computer by the user with a current location of the mobile navigation system; and
   upon determining the destination and the current location are within a predetermined range, conclude that the mobile navigation system has arrived at the destination;
   receive a command in response to the automatic detection of the arrival of the mobile navigation system at the destination;
   sense when a vehicle carrying the mobile navigation system has been motionless for a predetermined period of time using a motion detector or a series of location reports from the navigation computer which show no movement of the vehicle;
   check, in response to receiving the command of the arrival of mobile navigation system at the destination and sensing the vehicle carrying the mobile navigation system has been motionless for the predetermined period of time, a map of the parking spaces of the destination to determine that the vehicle is parked in one of the parking spaces on the map;
   find, upon receiving the command in response to the automatic detection of the arrival of the mobile navigation system at the destination, sensing the vehicle has been motionless for the predetermined period of time, and determining that the vehicle is parked in one of the parking spaces on the map, that the vehicle carrying the mobile navigation system has parked in a vacant parking space location; and transmit, after the automatic detection of the arrival of the mobile navigation system at the destination, an arrival notice to a third party, the arrival notice indicating that the mobile navigation system has arrived at the destination and instructing the third party to perform an operation for the user of the mobile navigation system, wherein receiving the command in response to the automatic detection of the arrival of the mobile navigation system at the destination, sensing the vehicle has been motionless for the predetermined period of time, and determining that the vehicle is parked in the vacant parking space location on the map, avoids a false interpretation that the vehicle has parked.

2. The mobile navigation system of claim 1, wherein:
the execution of the programming by the processor further directs the mobile navigation system to provide local information to the user of the mobile navigation system that is tailored to the destination, in response to detection of the arrival of the mobile navigation system at the destination, the local information including the vacant parking space location; and
the local information further includes a local map of the destination.

3. The mobile navigation system of claim 2 wherein the destination is an airport and the local map is a map of the airport.

4. The mobile navigation system of claim 2 wherein the destination is a shopping center and the local map is a map of the shopping center.

5. The mobile navigation system of claim 2 wherein the mobile navigation system allows the user to select a location on the local map and provides guidance to the user about how to navigate to the location.

6. The mobile navigation system of claim 2 wherein the local information further includes promotional information relating to one or more establishments at or near the destination.

7. The mobile navigation system of claim 6 wherein the promotional information includes one or more advertisements.

8. The mobile navigation system of claim 7 wherein the advertisements include one or more coupons.

9. The mobile navigation system of claim 6 wherein the promotional information is about a competitor of an establishment that is near the destination.

10. The mobile navigation system of claim 6 wherein the mobile navigation system allows the user to select one of the establishments and to provide guidance to the user about how to navigate to the selected establishment.

11. The mobile navigation system of claim 1 wherein the vacant parking space location is based on a database of notices from vehicles leaving parking spaces.

12. The mobile navigation system of claim 2 wherein the local information further includes a search function which the user may use to locate a more specific location at the destination.

13. The mobile navigation system of claim 2 wherein the local information is based on a profile of the user.

14. The mobile navigation system of claim 13 wherein the profile of the user includes data relating to other destinations to which the mobile navigation system has guided the user.

15. The mobile navigation system of claim 2 wherein the execution of the programming by the processor further directs the mobile navigation system to ask the user for permission to provide the local information to the user.

16. The mobile navigation system of claim 2 wherein the execution of the programming by the processor further directs the mobile navigation system to automatically provide the local information to the user upon detection of the arrival of the mobile navigation system at the destination.

17. The mobile navigation system of claim 16 wherein, at the time the mobile navigation system receives the destination to which the user wishes to travel, the mobile navigation system asks the user whether the user wants the local information to be provided in response to detection of the arrival of the mobile navigation system at the destination.

18. The mobile navigation system of claim 16 wherein the mobile navigation system includes a global user setting which a user may set to automatically receive or not to automatically receive the local information each time the mobile navigation system detects the arrival of the mobile navigation system at a destination.

19. The mobile navigation system of claim 2 wherein the mobile navigation system allows the user to specify one or more of plural types of local information to be provided upon arrival at the destination.

20. The mobile navigation system of claim 2 wherein, at the time the mobile navigation system receives the destination to which the user wishes to travel, the mobile navigation system receives an input from the user indicating the types of local information that are to be provided upon arrival at the destination.

21. The mobile navigation system of claim 1, wherein the performing of the operation includes at least one of automatically checking-in the user to a service provided by the third party and automatically placing an order for the user by the third party.

22. The mobile navigation system of claim 1, wherein the arrival notice notifies at least one of an employee, a third party agent, a human representative, and an automated check-in system of the third party that the mobile navigation system has arrived at the destination.

* * * * *